(12) United States Patent
Akcay et al.

(10) Patent No.: US 11,933,591 B2
(45) Date of Patent: *Mar. 19, 2024

(54) TEST SYSTEM FOR THROWING MECHANISMS

(71) Applicant: TUSAS- TURK HAVACILIK VE UZAY SANAYII ANONIM SIRKETI, Ankara (TR)

(72) Inventors: Ali Akcay, Ankara (TR); Onur Imece, Kazan/Ankara (TR); Sabri Senturk, Kazan/Ankara (TR); Nihat Serkan Akcay, Kazan/Ankara (TR)

(73) Assignee: TUSAS- TURK HAVACILIK VE UZAY SANAYII ANONIM SIRKETI, Ankara (TR)

( * ) Notice: Subject to any disclaimer, the term of this patent is extended or adjusted under 35 U.S.C. 154(b) by 632 days.

This patent is subject to a terminal disclaimer.

(21) Appl. No.: 17/263,316

(22) PCT Filed: Aug. 7, 2019

(86) PCT No.: PCT/TR2019/050660
§ 371 (c)(1),
(2) Date: Jan. 26, 2021

(87) PCT Pub. No.: WO2020/112048
PCT Pub. Date: Jun. 4, 2020

(65) Prior Publication Data
US 2021/0164757 A1    Jun. 3, 2021

(30) Foreign Application Priority Data
Aug. 8, 2018  (TR) .................................. 2018/11489

(51) Int. Cl.
*F42B 35/00*  (2006.01)
*G01L 5/00*  (2006.01)

(52) U.S. Cl.
CPC ................ *F42B 35/00* (2013.01); *G01L 5/00* (2013.01)

(58) Field of Classification Search
CPC . G01N 3/303; G01N 3/30; G01N 3/32; B64D 1/04; B64D 1/02; B64D 1/00; B64D 1/08
See application file for complete search history.

(56) References Cited

U.S. PATENT DOCUMENTS

| 3,659,462 | A | 5/1972 | Cole |
| 5,351,597 | A | 10/1994 | Holmstrom |

(Continued)

FOREIGN PATENT DOCUMENTS

| CN | 202693178 U | 1/2013 |
| CN | 103644995 A | 3/2014 |
| MY | 154714 A | 7/2015 |

OTHER PUBLICATIONS

International Search Report and Written Opinion for corresponding PCT application No. PCT/TR2019/050660, dated Jun. 12, 2020.

(Continued)

*Primary Examiner* — Son T Le
*Assistant Examiner* — Brian Butler Geiss
(74) *Attorney, Agent, or Firm* — Notaro, Michalos & Zaccaria P.C.

(57) ABSTRACT

A test system is disclosed that has a chassis, a throwing mechanism that is located at an upper part of the chassis onto which at least one weight is attached and provides throwing the weight attached thereon, a base that is located at a lower part of the chassis and onto which a weight is thrown by the throwing mechanism, a control unit that provides throwing the weigh through the throwing mechanism, and a position adjuster is located on the base or chassis and provides aligning the weight thrown onto the base on the base.

13 Claims, 4 Drawing Sheets

(56) References Cited

U.S. PATENT DOCUMENTS

| | | | |
|---|---|---|---|
| 9,057,660 B2* | 6/2015 | Bin Jamaludin | G01M 7/08 |
| 11,306,992 B2* | 4/2022 | Akcay | G01M 99/008 |
| 2021/0164757 A1* | 6/2021 | Akcay | F41A 19/58 |
| 2021/0239441 A1* | 8/2021 | Akcay | B64D 1/02 |
| 2021/0247275 A1* | 8/2021 | Akcay | G01M 99/005 |

OTHER PUBLICATIONS

Written Opinion of the International Preliminary Examining Authority for corresponding PCT application No. PCT/ TR2019/050660, dated Oct. 26, 2020.

International Preliminary Report on Patentability for corresponding PCT application No. PCT/TR2019/050660, completed Dec. 11, 2020.

\* cited by examiner

TEST SYSTEM FOR THROWING MECHANISMS

The present invention relates to systems in which life tests are performed for the throwing mechanisms that provide throwing a weight to a target.

In order to release or throw ammunition to a target, throwing mechanisms are utilised in air vehicles. In addition, for various carrying systems, there exists throwing mechanisms that provide holding or releasing or throwing a weight. Life tests of said throwing systems are generally performed such that a weight is repeatedly attached to the throwing mechanism by manpower.

U.S. Pat. No. 5,351,597A covered by the known art discloses a reliable release system which is able to operate in accordance with different types of ammunition. The system comprises an electronic system with electrical characteristics suitable for different types of ammunition, and an ammunition carrying unit. An indication unit is provided in the ammunition carrying unit, wherein the indication unit indicates the ammunition type that is placed at the carrying unit. Said ammunition is released by a control unit which is provided in said system. However, life test of the ammunition system is not mentioned.

In the known art, life tests of throwing mechanisms are carried out by manpower. Weight that is thrown out of the throwing mechanism is re-attached to the throwing mechanism by manpower so that the throwing mechanism is operated once again. This process may be repeated over and over. Life test is performed on the throwing mechanism itself. Performing re-attaching process of the weight to the throwing mechanism by a human causes various work-related accidents, test errors and/or time losses.

Thanks to the test system of the present invention, throwing mechanisms which are used in air vehicles to throw ammunition can be tested independently of the manpower; thus an easy-to-use, practical, effective, efficient and reliable test system is achieved.

Another object of the present invention is to provide a test system for performing life tests of throwing mechanisms in an automated and controlled manner.

A further object of the present invention is to provide a test system which provides performing tests of throwing mechanisms independently of manpower.

Yet another object of the present invention is to provide a simple, easy-to-use, practical, effective, efficient and reliable test system.

The test system for achieving object of the present invention which is defined in the first claim and the dependent claims thereof comprises a chassis; a throwing mechanism which is located at an upper part of the chassis for testing; a weight which is attached so as to be released or thrown by being pushed out of the throwing mechanism; a base which is located at a lower part of the chassis and onto which a weight is thrown; a control unit which provides throwing the weight out of the throwing mechanism by pushing; and a position adjuster which is located on the base or chassis and provides bringing the weight, which has fallen onto the base, into a desired position.

Test system of the present invention comprises a control unit which controls operations of throwing the weight through the throwing mechanism, positioning on the base the weight, which has fallen onto the base, by the position adjuster such that the weight faces the throwing mechanism, moving the base upwards, and re-attaching the weight provided on the base to the throwing mechanism, and which, by this way, allows life test (life of operating properly) (fatigue) to be performed automatically on the throwing mechanism with zero-touch.

In an embodiment of the invention, the test system comprises a control unit which provides bringing the base to a predetermined height before throwing mechanism performs throwing operation.

In an embodiment of the invention, the test system comprises at least one sensor which is located on the throwing mechanism or chassis and allows information to be transmitted to the control unit when a weight is attached to the throwing mechanism.

In an embodiment of the invention, the test system comprises a sensor triggered by contact of the weight while the base is moved upwards through the control unit.

In an embodiment of the invention, the test system comprises at least one damper preferably in the form of a spring, which is located on the base and provides absorbing impact effect of the weight that has fallen onto the base, and at least one lifting member which provides lifting the base up and located on the chassis and/or the ground.

In an embodiment of the invention, the test system comprises a lifting member which has a first position (I) in which the lifting member faces the base under the base and a gap is present between the base and lifting member, a second position (II) in which the lifting member is brought by extending by the control unit from the first position (I) and contacts the base, and a third position (III) in which the base is lifted up at the second position (II) and brought to a predetermined point; and a damper which is preferably connected at one end to the ground, located on the base, extends downwards from the base, and provides avoiding the base, onto which a weight has fallen, from hitting the lifting member.

In an embodiment of the invention, the test system comprises at least one support which is located on the base, extends outwards from the base and against which the lifting member rests while the base is lifted up. The test system comprises a support and a lifting member, wherein the surfaces at which they contact each other have the same form and width.

In an embodiment of the invention, the test system comprises at least one rail located on the chassis and at least one bar which allows the base to be moved up and down on the rail.

In an embodiment of the invention, the test system comprises at least one housing located on the throwing mechanism, at least one hook located in the housing, and at least one ring located on the weight, extending outwards from the weight and held by the hook when weight is attached to the throwing mechanism.

In an embodiment of the invention, the test system comprises at least one pushing member which is located on the throwing mechanism, operated by the control unit and extends from the throwing mechanism to the weight in order to provide throwing the weight downwards by pushing.

In an embodiment of the invention, the test system comprises at least one strengthening member which is located on the weight, to which the pushing member contacts during throwing operation, and which increases durability of the weight.

In an embodiment of the invention, the test system comprises a strengthening member located on the weight and comprising a material which is different from material of the weight and has a higher impact resistance.

In an embodiment of the invention, the test system comprises a throwing mechanism used in air vehicles for throwing ammunition.

In an embodiment of the invention, the test system allows life test to be performed automatically on the throwing mechanism used in air vehicles.

The test system realized to achieve the object of the present invention is illustrated in the attached drawings, in which.

Figure 1:
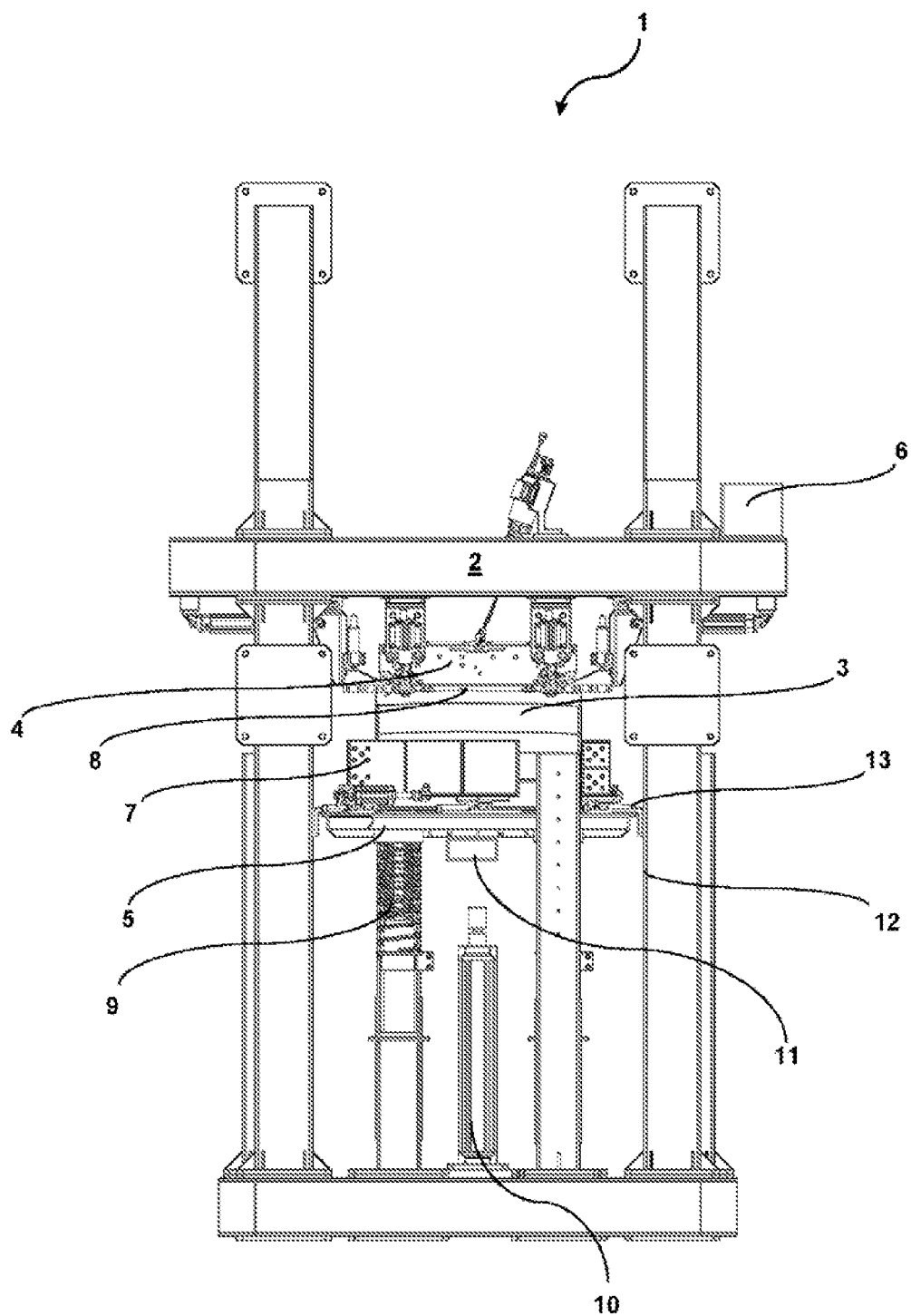
FIG. 1 is a front view of a test system.
Figure 2:
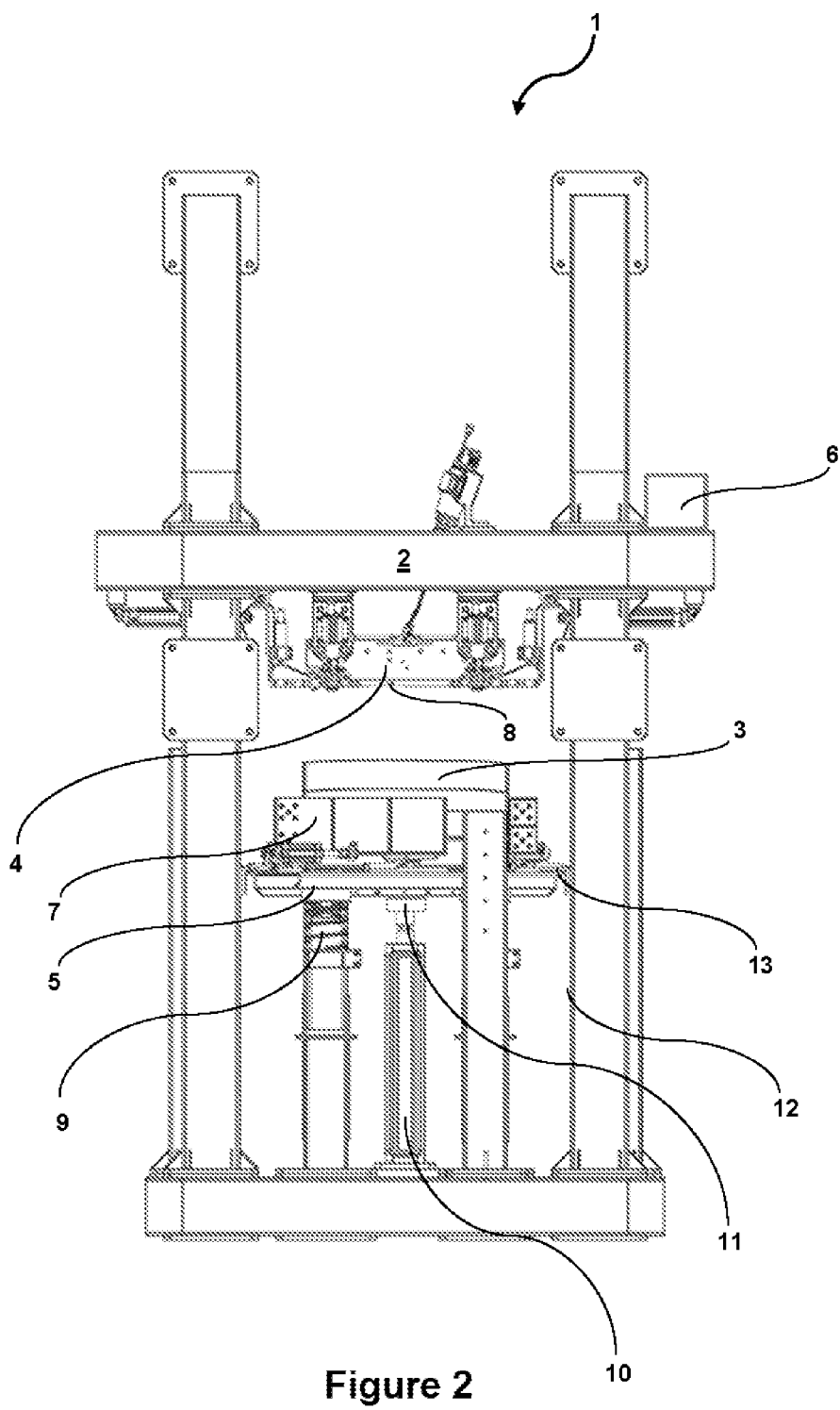
FIG. 2 is a front view of a test system.
Figure 3:
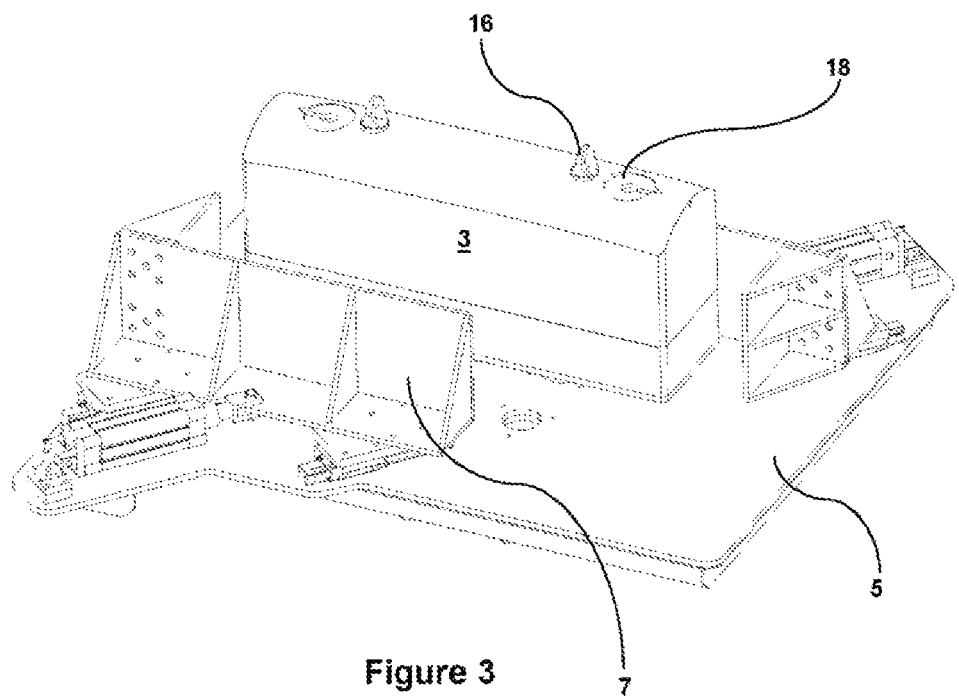
FIG. 3 is a perspective view of a position adjustor, a weight and a base.

All the parts illustrated in figures are individually assigned a reference numeral and the corresponding terms of these numbers are listed below:
1. Test System
2. Chassis
3. Weight
4. Throwing Mechanism
5. Base
6. Control Unit
7. Position Adjuster
8. Sensor
9. Damper
10. Lifting member
11. Support
12. Rail
13. Bar
14. Housing
15. Hooker
16. Ring
17. Pushing Member
18. Strengthening Member The test system (1) comprises a chassis (2); a throwing mechanism (4) which is located at an upper part of the chassis (2), onto which at least one weight (3) is attached and which provides throwing the weight (3) attached thereon; a base (5) which is located at a lower part of the chassis (2) and onto which a weight (3) is thrown by the throwing mechanism (4); a control unit (6) which provides throwing the weight (3) through the throwing mechanism (4); and a position adjuster (7) which is located on the base (5) or chassis (2) and provides aligning (5) the weight (3) thrown onto the base (5) on the base (FIG. 1, FIG. 2, FIG. 3).

Test system (1) of the present invention comprises a control unit (6) which controls operations of aligning on the base (5) the weight (3), which has been thrown onto the base (5), by the position adjuster (7) such that the weight (3) faces the throwing mechanism (4), and re-attaching the weight (3) provided on the base (5) to the throwing mechanism (4) by moving the base (5) closer to the throwing mechanism (4), and which, by this way, allows the throwing mechanism (4) to be tested automatically. Weight (3) is thrown out of the throwing mechanism (4) through the control unit (6). When the weight (3) falls onto the base (5), its position on the base (5) is changed so that the weight (3) faces the throwing mechanism (4) in order to be re-attached to the throwing mechanism (4) through the position adjuster (7). The base (5) is lifted by the control unit (6), thereby re-attaching the weight (3) to the throwing mechanism (4). Throwing the weight (3) out of the throwing mechanism (4) and re-attaching the same to the throwing mechanism (4) is performed repeatedly. Therefore, it is controlled whether the throwing mechanism (4) operates properly. Thus, life test is performed on the throwing mechanism (4) in a fully automatic way without human intervention.

In an embodiment of the invention, the test system (1) comprises a control unit (6) which, before throwing mechanism (4) performs throwing operation, provides bringing the base (5) to a predetermined height set by the manufacturer. The base (5) is brought to a predetermined height before the throwing operation through the control unit (6). Therefore, the weight (3) is avoided from falling onto a point apart from the base (5).

In an embodiment of the invention, the test system (1) comprises at least one sensor (8) which is located on the throwing mechanism (4) or chassis (2) and allows information to be transmitted to the control unit (6) when a weight (3) is attached to the throwing mechanism (4). The weight (3) that has fallen onto the base (5) is lifted with the base (5) via the control unit (6). Through the sensor (8) which senses that weight (3) is at a height sufficient to attach the weight (3) to the throwing mechanism (4), information is transmitted to the control unit (6) in order to complete the operation of lifting the base (5).

In an embodiment of the invention, the test system (1) comprises a sensor (8) triggered by contact of the weight (3) while the weight (3) is attached to the throwing mechanism (4). While the weight (3) located on the base (5) is lifted up via the base (5) which is lifted by the control unit (6), the weight (3) contacts with the sensor (8) when the weight (3) is brought to a certain height. Upon lifting the weight (3), the sensor (8) is pushed so that it is triggered.

In an embodiment of the invention, the test system (1) comprises at least one damper (9) which is located on the base (5) and provides absorbing impact effect of the weight (3) that has fallen onto the base (5), and at least one lifting member (10) which provides lifting the base (5) up and located on the chassis (2) and/or the ground (F). through the damper (9) which is preferably a spring system, impact force of the weight (3) that has fallen onto the base (5) is absorbed by the damper (9). Upon upwards extension of the lifting member (10) which is preferably located under the base (5), it is provided that the base (5) is lifted. The lifting member (10) is operated by the control unit (6).

In an embodiment of the invention, the test system (1) comprises a lifting member (10) which has a first position (I) in which the lifting member (10) faces the base (5) under the base (5) and a distance is present between the base (5) and lifting member (10), a second position (II) in which the lifting member (10) is lifted up and brought by the control unit (6) from first position (I) and contacts the base (5), and a third position (III) in which the base (5) is pushed upwards at the second position (II) and brought to a predetermined point; and a damper (9) which is located on the base (5), extends downwards from the base (5), and provides avoiding the base (5), onto which a weight (3) has fallen, from hitting the lifting member (10). The damper (9) is located between the base (5) and ground (F). Lifting member (10) is located on the chassis (2) and/or ground (F) so that it is under the base (5). Thanks to the damper (9), when weight (3) falls onto the base (5), the base (5) is avoided from hitting the lifting member (10).

In an embodiment of the invention, the test system (1) comprises at least one support (11) which is located on the base (5), extends outwards from the base (5) and to which lifting member (10) contacts while the base (5) is lifted up. The test system (1) comprises a support (11) integral with the base (5), located on the base (5) so as to strengthen endurance of the base (5) and extending outwards from the base (5). Lifting member (10) pushes the support (10) located on the base (5) to move the base (5) upwards on the chassis (2), thus providing moving the base (5) closer to the throwing mechanism (4).

In an embodiment of the invention, the test system (1) comprises at least one rail (12) located on the chassis (12) and at least one bar (13) which is located on the base (5) and allows the base (5) to be moved up and down on the rail (12). Therefore, base (5) can move upwards and downwards on the chassis (2) in a balanced and efficient manner.

In an embodiment of the invention, the test system (1) comprises at least one housing (14) located on the throwing mechanism (4), at least one hook (15) located in the housing (14), and at least one ring (16) located on the weight (3), extending outwards from the weight (3) and held by the hook (15) for allowing the weight (3) to hold on to the throwing mechanism (4). Weight (3) which is located on the base (5) moved upwards by the control unit (6) is attached to the hook (15) via ring (16). Thus, weight (3) is attached to the throwing mechanism (4). When a weight (3) is to be thrown out of the throwing mechanism (4), the hook (15) rotates around its own axis such that it passes from a closed position, in which the hook (15) holds the ring (16), to an opened position (0) in which the ring (16) is free. By this way, weight is both attached to and released out of the throwing mechanism (4) easily.

Figure 4:
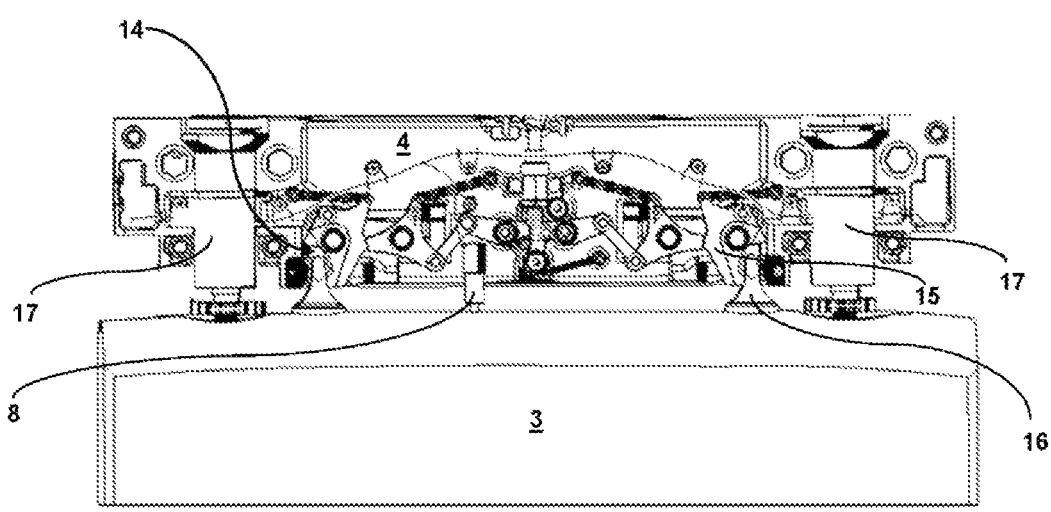
FIG. 4 is a front view of a throwing mechanism and a weight.

In an embodiment of the invention, the test system (1) comprises at least one pushing member (17) which is located on the throwing mechanism (4), operated by the control unit (6) and extends from the throwing mechanism (4) to the weight (3) in order to provide throwing the weight (3) downwards by pushing. On the throwing mechanism (4), there is located a pushing member (17) which preferably has a cylindrical form. Pushing member (17) is controlled by the control unit (6). When weight (3) is to be pushed, the hook (15) is brought to the opened position (0) and the pushing member (17) extends rapidly out of the throwing mechanism (4) so as to push the weight (3) downwards (FIG. 4).

In an embodiment of the invention, the test system (1) comprises at least one strengthening member (18) which is located on the weight (3), to which the pushing member (17) contacts during throwing operation, and which increases endurance of the weight (3). During life test, weight (3) is pushed by the pushing member (17) more than once. For that reason, strengthening member (18) is provided at an area of the weight (3) contacting the pushing member (17).

In an embodiment of the invention, the test system (1) comprises a strengthening member (18) located on the weight (3) and comprising a material that is more durable than material of the weight (3). The strengthening member (18) preferably comprises another material that is more durable than overall material structure of the weight (3) in terms of endurance. Therefore, impact resistance of the weight (3) is increased.

In an embodiment of the invention, the test system (1) comprises a throwing mechanism (4) used in air vehicles for throwing weight (3). The throwing mechanism (4) provides releasing and/or throwing a weight (3), which is ammunition, from an air vehicle to a target.

Figure 5:
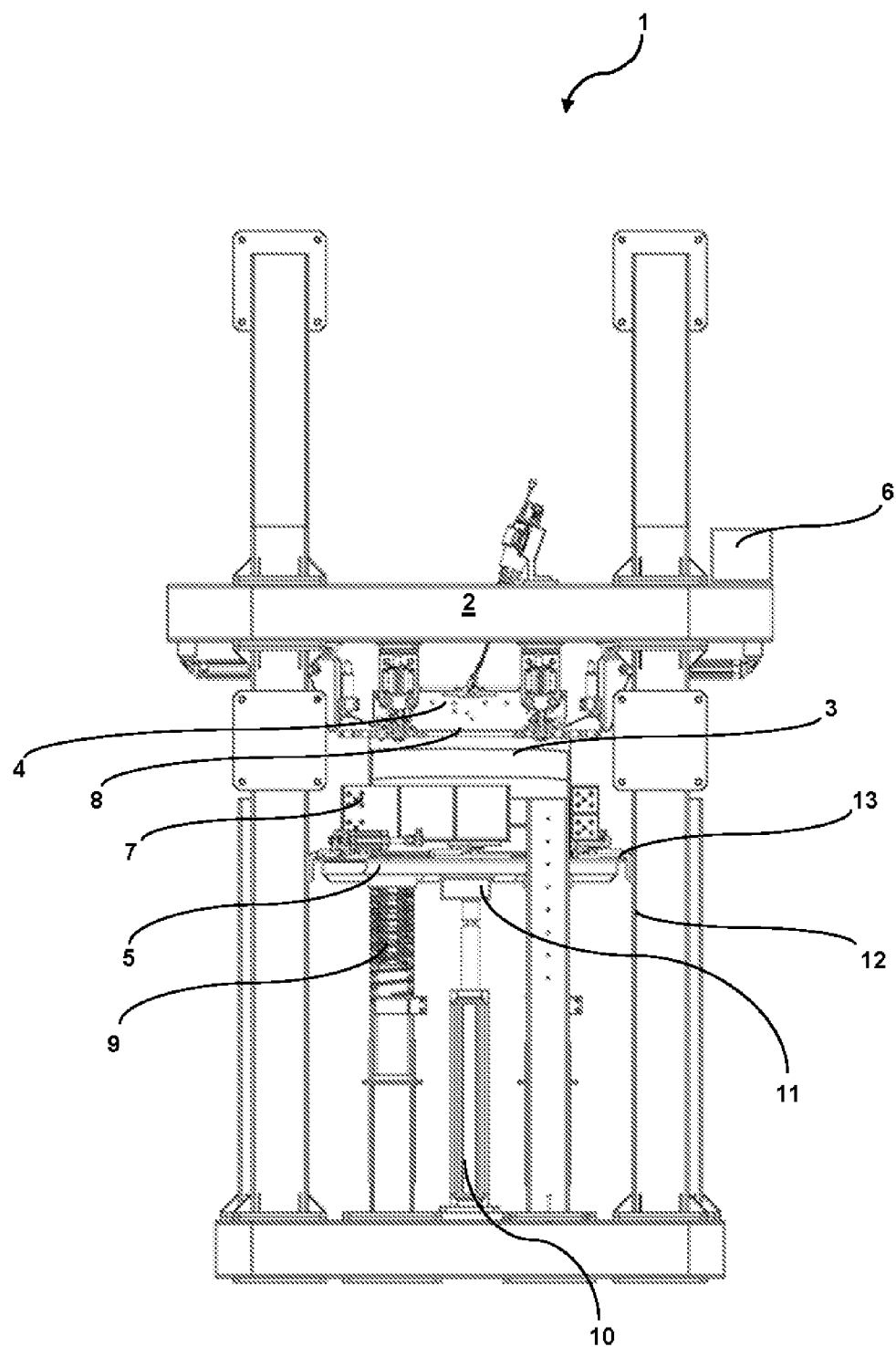
FIG. 5 is a front view of a test system.

In an embodiment of the invention, the test system (1) allows the throwing mechanism (4) used in air vehicles to be tested. Thanks to the test system (1), weight (3), which is ammunition, is automatically thrown out of the throwing mechanism (4) and re-attached to the throwing mechanism (4) automatically. Therefore, the throwing mechanism (4) is operated more than once, and a life test is performed automatically thereon with zero-touch (FIG. 5).

Thanks to the test system (1) of the present invention, throwing mechanisms (4) which are used to throw weight (3) such as ammunition, etc. can be tested independently of the manpower; thus, an easy-to-use, practical, effective, efficient and reliable test system (1) is achieved.

The invention claimed is:

1. A test system (1) comprising a chassis (2); a throwing mechanism (4) which is located at an upper part of the chassis (2), onto which at least one weight (3) is attached and which provides throwing the weight (3) attached thereon; a base (5) which is located at a lower part of the chassis (2) and onto which a weight (3) is thrown by the throwing mechanism (4); a control unit (6) which provides throwing the weight (3) through the throwing mechanism (4); and a position adjuster (7) which is located on the base (5) or chassis (2) and provides aligning the weight (3) thrown onto the base (5) on the base (5), wherein the control unit (6) controls operations of aligning the weight (3) on the base (5), which has been thrown onto the base (5) by the position adjuster (7) such that the weight (3) faces the throwing mechanism (4), and re-attaching the weight (3) provided on the base (5) to the throwing mechanism (4) by moving the base (5) closer to the throwing mechanism (4), and which, by this way, allows the throwing mechanism (4) to be tested automatically.

2. The test system (1) according to claim 1, wherein the control unit (6), before throwing mechanism (4) performs throwing operation, provides bringing the base (5) to a predetermined height set by the manufacturer.

3. The test system (1) according to claim 1, comprising at least one sensor (8) which is located on the throwing mechanism (4) or chassis (2) and allows information to be transmitted to the control unit (6) when the weight (3) is attached to the throwing mechanism (4).

4. The test system (1) according to claim 3, wherein one of the at least one sensor (8) is triggered by contact of the weight (3) while the weight (3) is attached to the throwing mechanism (4).

5. The test system (1) according to claim 1, comprising at least one damper (9) which is located on the base (5) and provides absorbing impact effect of the weight (3) that has fallen onto the base (5), and at least one lifting member (10) which provides lifting the base (5) up and located on the chassis (2) and/or the ground (F).

6. The test system (1) according to claim 5, comprising a lifting member (10) which has a first position (I) in which the lifting member (10) faces the base (5) under the base (5) and a distance is present between the base (5) and lifting member (10), a second position (II) in which the lifting member (10) is lifted up and brought by the control unit (6) from first position (I) and contacts the base (5), and a third position (III) in which the base (5) is pushed upwards at the second position (II) and brought to a predetermined point; and a damper (9) which is located on the base (5), extends downwards from the base, and provides avoiding the base (5), onto which the weight (3) has fallen, from hitting the lifting member (10).

7. The test system (1) according to claim 5, comprising at least one support (11) which is located on the base (5), extends outwards from the base (5) and to which lifting member (10) contacts while the base (5) is lifted up.

8. The test system (1) according to claim 1, comprising at least one rail (12) located on the chassis (12) and at least one bar (13) which is located on the base (5) and allows the base (5) to be moved up and down on the rail (12).

9. The test system (1) according to claim 1, comprising at least one housing (14) located on the throwing mechanism (4), at least one hook (15) located in the housing (14), and at least one ring (16) located on the weight (3), extending outwards from the weight (3) and held by the hook (15) for allowing the weight (3) to hold on to the throwing mechanism (4).

10. The test system (1) according to claim 1, comprising at least one pushing member (17) which is located on the throwing mechanism (4), operated by the control unit (6) and extends from the throwing mechanism (4) to the weight (3) in order to provide throwing the weight (3) downwards by pushing.

11. The test system (1) according to claim 10, comprising at least one strengthening member (18) which is located on the weight (3), to which the pushing member (17) contacts during throwing operation, and which increases endurance of the weight (3).

12. The test system (1) according to claim 11, wherein one of the at least one strengthening member (18) is located on the weight (3) and comprises a material that is more durable than material of the weight (3).

13. The test system (1) according to claim 1, comprising a throwing mechanism (4) used in air vehicles for throwing weight (3).

* * * * *